(12) United States Patent
Glass, Jr.

(10) Patent No.: US 6,195,039 B1
(45) Date of Patent: Feb. 27, 2001

(54) LOCATION SIGNALLING APPARATUS

(76) Inventor: Robert T. Glass, Jr., Mt. Penn Chiropractic Center 2140 Howard Blvd., Mt. Penn, PA (US) 19606

( * ) Notice: Subject to any disclaimer, the term of this patent is extended or adjusted under 35 U.S.C. 154(b) by 0 days.

(21) Appl. No.: 08/979,767

(22) Filed: Nov. 26, 1997

(51) Int. Cl.[7] .................................. G01S 1/08; B63C 9/08
(52) U.S. Cl. ...................... 342/357.09; 342/386; 441/89
(58) Field of Search .................... 342/457, 357, 342/386, 357.09, 357.07; 441/80, 89; 343/18 B, 709, 718; 116/210; 455/95, 100, 98

(56) References Cited

U.S. PATENT DOCUMENTS

| | | | |
|---|---|---|---|
| 3,676,779 | * | 7/1972 | Faulring et al. ........................ 455/98 |
| 3,727,229 | * | 4/1973 | Clinger et al. ........................ 116/210 |
| 4,042,882 | * | 8/1977 | Camacho et al. ...................... 455/98 |
| 4,048,565 | * | 9/1977 | Rice, Sr. ................................ 455/98 |
| 4,219,819 | * | 8/1980 | Patel .................................. 343/18 B |
| 4,281,427 | * | 8/1981 | Petters ................................. 116/210 |
| 4,416,433 | * | 11/1983 | Bellina ................................ 116/210 |
| 4,498,879 | * | 2/1985 | Burr ..................................... 441/80 |
| 4,697,706 | * | 10/1987 | Schaller ............................... 116/210 |
| 5,408,238 | * | 4/1995 | Smith .............................. 342/357.09 |
| 5,517,199 | * | 5/1996 | DiMattei ......................... 342/357.09 |
| 5,748,147 | * | 5/1998 | Bickley ................................ 342/457 |

* cited by examiner

Primary Examiner—Gregory C. Issing
(74) Attorney, Agent, or Firm—Richard P. Gilly

(57) ABSTRACT

A signalling device which is housed within a tubular container includes a mylar balloon; a pressurized, lighter-than-air gas source; and multiple beacon devices. The device signals its location and, as such, is useful in rescue or retrieval operations. A pressure vessel is connected to the balloon so that lighter-than-air gas contained within the pressure vessel can flow into the balloon. An RF transmitter, a Global Positioning System (GPS) receiver unit and a strobe light, are also coupled to the balloon. A valve separates located in the pressure vessel separates the lighter-than-air gas from the balloon until opened either manually or automatically. The balloon is inflated by the lighter-than-air gas which expands the balloon causing it to break through the top of the container and rise. As the balloon rises, the RF transmitter, the GPS receiver and the strobe light activate. The balloon is tethered to the container which, in turn, can be attached to a surface at the rescue location or to the person to be rescued.

7 Claims, 3 Drawing Sheets

LOCATION SIGNALLING APPARATUS

BACKGROUND OF THE INVENTION

1. Field of the Invention

The invention relates to the field of beacon-type, location signalling devices. A portable container encases a balloon, a pressurized gas source, a visual beacon, an RF transmitter and a GPS receiver. A release valve is actuated whereupon the pressurized gas source inflates the balloon which rises from the container carrying the RF transmitter GPS receiver and visual beacon aloft.

2. Prior Art

A crucial application for radio frequency (RF) transmitters and other beacon type devices is the location of persons in need of assistance, i.e. survivors of plane crashes or shipwrecks. Rescue devices of this type emit radio signals and/or visual signals which allow a rescue team to converge on the location of the victim. Often, these devices are fixed components of aircraft and ships. Alternatively, survival packs, which contain equipment for sending distress signals are often included in survival gear. For example, on military aircraft the pilot is equipped with a radio which automatically emits an RF signal upon the pilot ejecting from the plane. The radio is worn directly on the survival vest of the pilot.

Although effective in some applications, most beacon type rescue systems exhibit several shortcomings. Only a single beacon device, such as an RF transmitter, is utilized on a rescue system. Impact from a crash or ejection from a moving plane may damage the delicate circuits contained within the RF transmitter leaving the pilot without a working rescue device. While the pilot may eventually be found, the time it takes to locate the pilot will increase which could be crucial if the pilot is injured, or if the environment into which the pilot ejects is inhospitable. In many circumstances, a pilot will eject into an environment which is not conducive to the clear transmission of RF signals. For example, naval aviators will more likely than not eject over the ocean where salt water may short circuit the RF transmitter or the waves interfere with the transmission of RF signals. Moreover, the transmission of RF signals from the water may lure predators such as sharks which are attracted to high frequency sound.

U.S. Pat. No. 3,941,079—McNeill discloses an inflatable rescue device which features a balloon, coated with a radar reflective material. The balloon is inflated using a lighter-than-air gas and is connected to the victim by a tether line. Although this device floats above the crest of waves or other objects which could interfere with transmission of signals, it does not feature the use of an RF transmitter in conjunction with the balloon and merely relies upon radar visibility. Radar will only guide the rescue team to the general vicinity where the downed pilot lies. Upon arrival in the general vicinity of the downed pilot, a visual identification must be made in order to effect rescue. During darkness or inclimate weather, a balloon would provide little assistance in making a visual identification. In addition to these shortcomings, McNeill also requires manual actuation in order for the balloon to be inflated. This may not be possible if the pilot is unconscious or otherwise severely injured.

U.S. Pat. No. 2,825,803—Newbrough discloses a crash position signalling device which includes an RF transmitter. The transmitter is located within a housing which also contains an inflatable balloon and a tether line. Upon impact of the aircraft, the RF transmitter activates and the balloon inflates spooling a tether line from the housing. The balloon is coated with a radar reflective material, and the tether acts as an antenna for the RF transmitter. Although the antenna allows for the broadcasting of RF signals above obstacles such as waves, the RF transmitter in Newbrough broadcasts from or under water and thus may be vulnerable to short circuit, especially if the outer transmitter casing is damaged. In addition, Newbrough fails to increase the visibility of the downed pilot to the rescue team.

Thus, it would be advantageous to provide a location signalling apparatus which acts as a location beacon by generating both RF transmissions and visual signals without encumbrance from the surrounding environment.

Summary of the Invention

It is an object of the invention to provide a location signalling apparatus which includes multiple devices for sending signals allowing for the location of a person in an emergency situation.

It is a further object of the invention to provide a location signalling apparatus which includes a visual location device for assisting in the location of a person during close-in rescue operations.

It is still a further object of the invention to provide a location signalling apparatus which broadcasts location signals from an elevated position wherein the location signals are not interfered with by obstacles which may be encountered on the ground or on the surface of a body of water.

These and other objects are accomplished by a location signalling apparatus which is housed within a tubular container having a pressure sensitive top. The signalling apparatus comprises a balloon; a pressurized, lighter-than-air gas source; and multiple signalling devices. Pressurized, lighter-than-air gas is contained within a pressure vessel which is coupled to the balloon. An RF transmitter, a Global Positioning System (GPS) receiver unit and a strobe light are fixedly attached to the pressure vessel. A valve separates the contents of the pressure vessel from the balloon, thereby preventing the lighter-than-air gas from inflating the balloon until the valve is opened either manually or automatically. The valve is manually opened by a pull tab which is located on the exterior of the plastic container. Alternatively, the valve comprises an altimeter controlled solenoid which opens at a pre-set altitude. The opening of the valve causes the balloon to be filled with lighter-than-air gas. As the balloon is inflated with the lighter-than-air gas it expands and breaks through the top of the container. The balloon rises and the pressure vessel, the RF transmitter, the GPS receiver, and the strobe light are pulled clear of the container causing the beacon devices to activate and send locating signals. The balloon is fixed to a single location by a tether, which is connects the balloon to the container. The container is fixedly attached to an object, such as a vest or a boat.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims.

DETAILED DESCRIPTION OF THE PREFERRED EMBODIMENT

Figure 1:
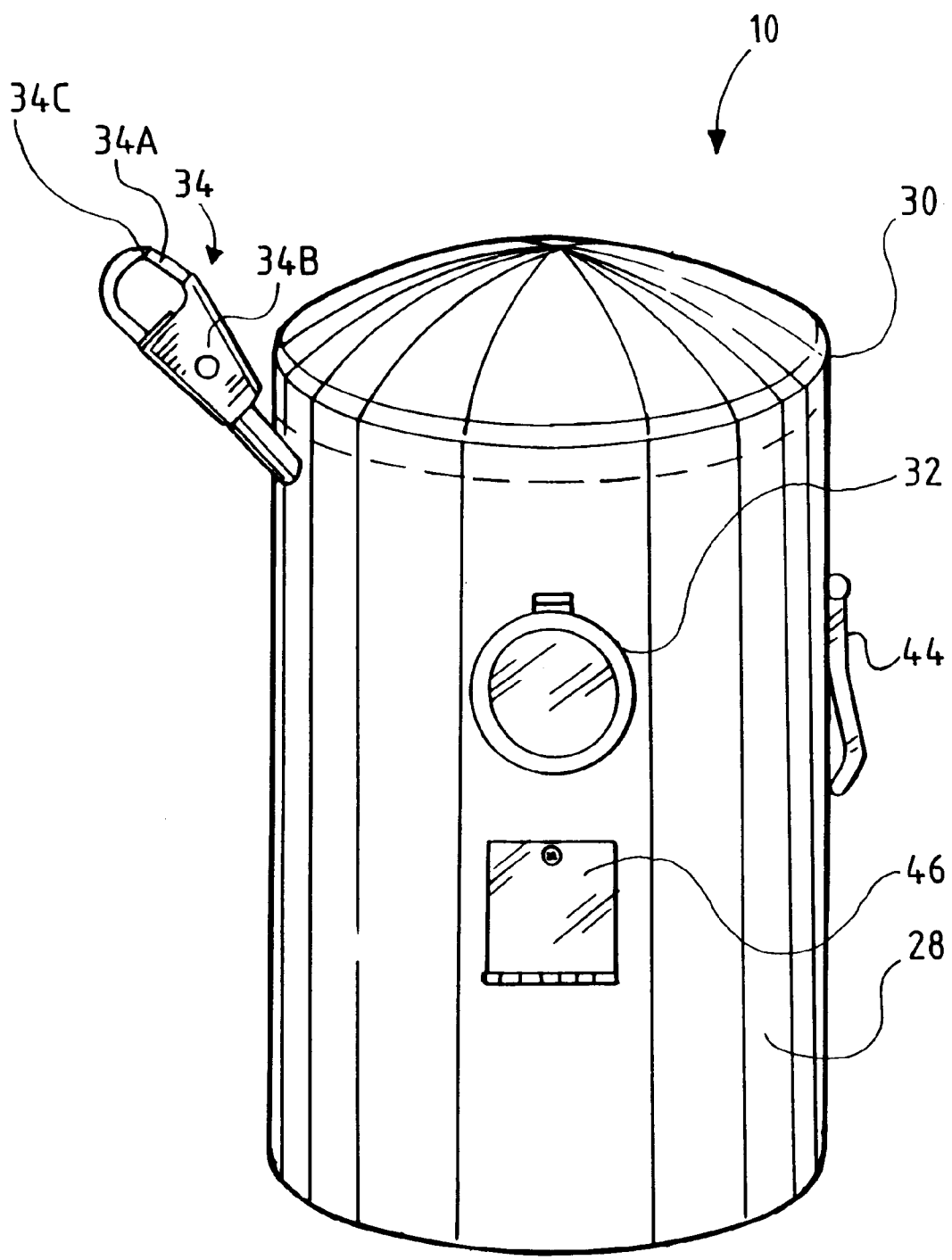
FIG. 1 is a side perspective view of the location signalling apparatus of the invention.
Figure 2:
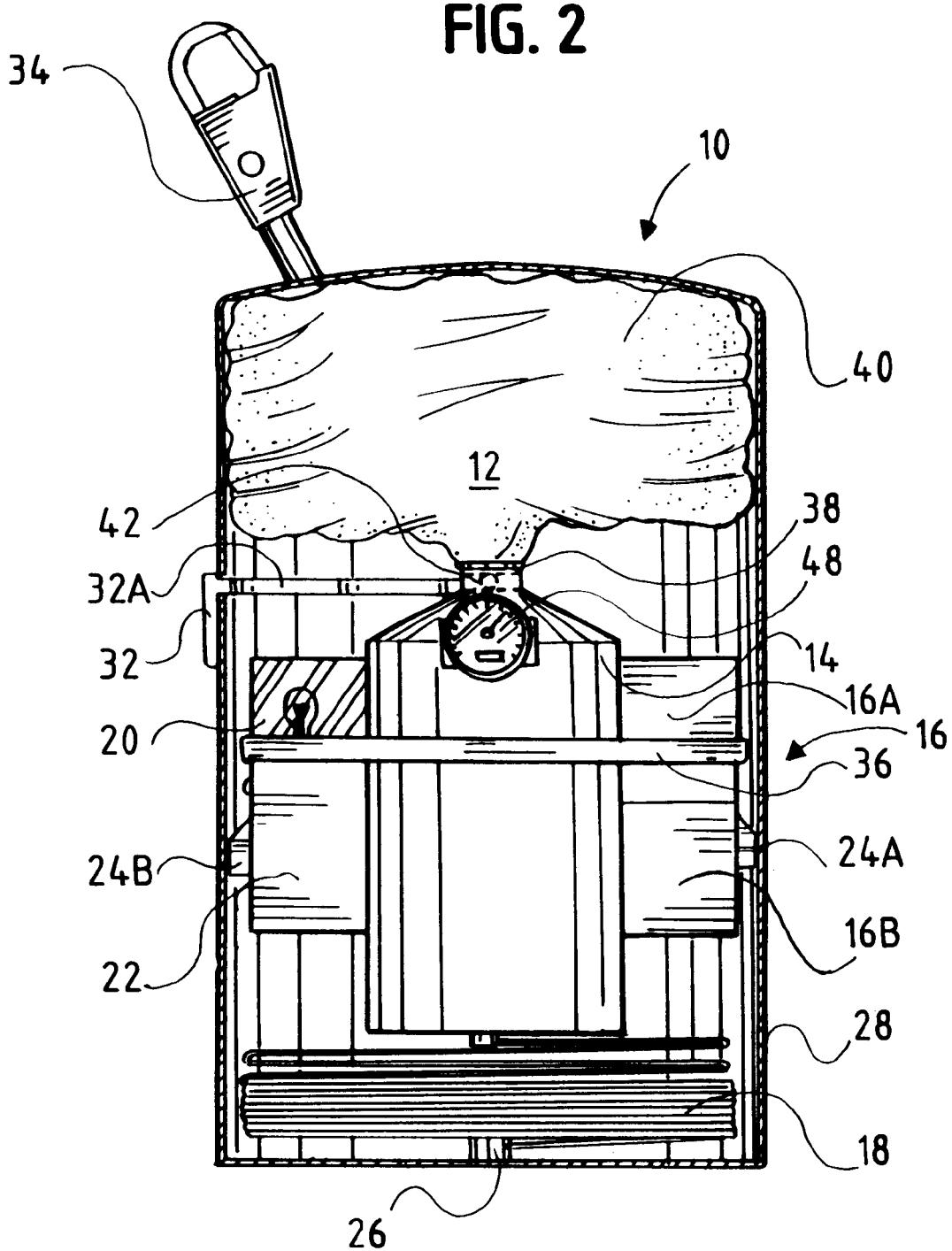
FIG. 2 is a side sectional view of the location signalling apparatus of the invention taken along line 2—2 of FIG. 1.

Referring to FIGS. 1 and 2, wherein the same reference numbers are used throughout to indicate the same elements, FIG. 1 shows the outer container 28 of the location signalling apparatus 10 of the present invention. Container 28 is preferably constructed from durable, lightweight plastic material, such as PVC, which will withstand severe shock and impact. By signalling its location, apparatus 10 is particularly useful in rescue and retrieval operations of persons or even objects or cargo.

Figure 3:
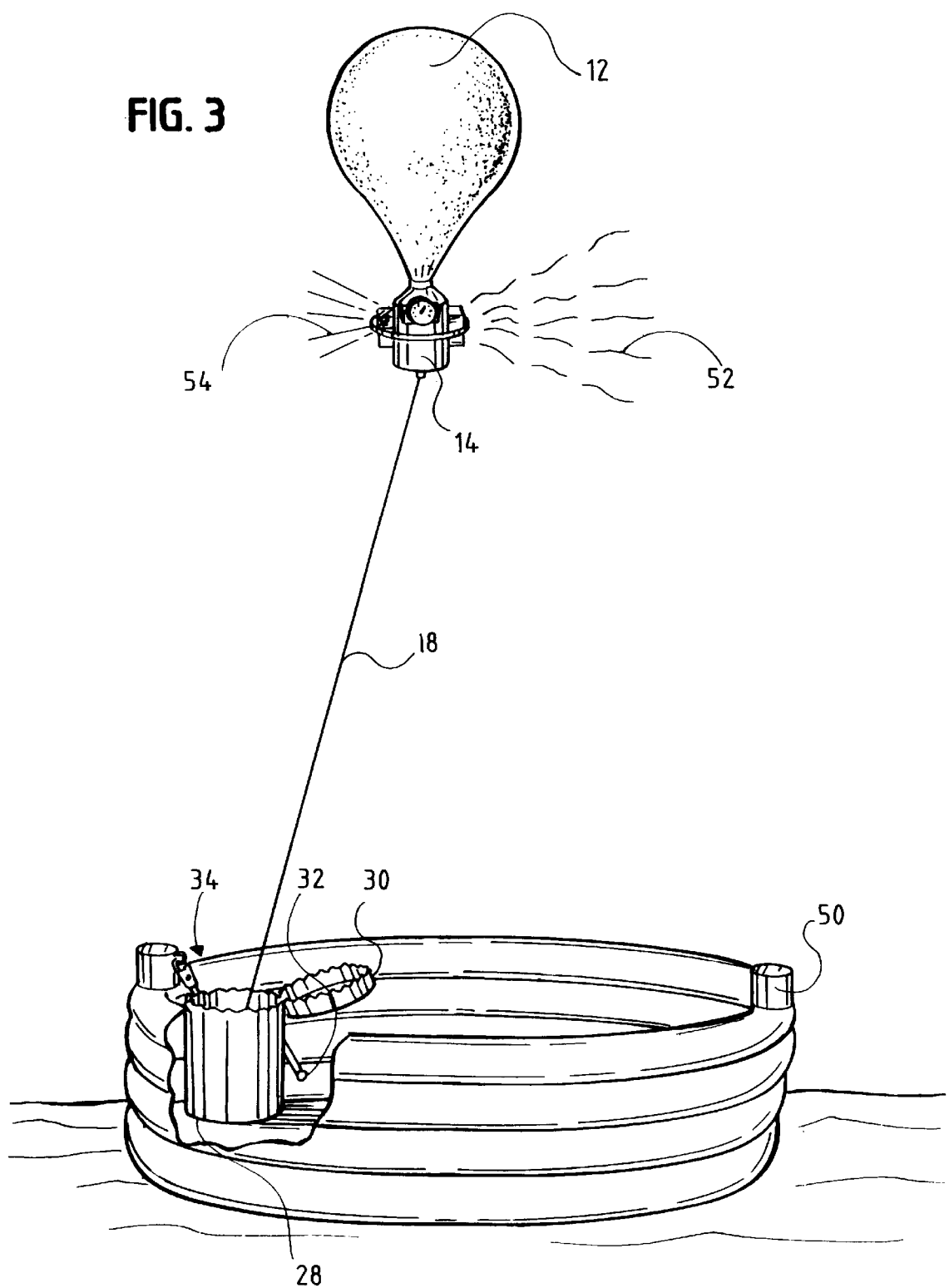
FIG. 3 is a pictorial view showing the location signalling apparatus activated and connected to the side of a raft.

Container 28 is sufficiently compact and portable so as to be carried by a pilot on a survival vest or other garment. Alternatively, the container 28 is attached directly to a life boat as shown in FIG. 3. The container 28 is fixedly attached to an object by a device such as a safety latch, a harness, a hook and loop system, or tape. As shown in the preferred embodiment, the container 28 is attached to an object by either an alligator-type clip 44 or a carabiner-type clip 34 which are located on the outer surface of container 28. Alligator type clip 44 is fixedly attached at one end to container 28. This allows the unattached end of clip 44 to be lifted and an object, such as a belt or other garment, to be slid underneath the unattached end. Once the object is inserted, the loose end of the clip 44 is released and the object is engaged between the clip 44 and the container 28. Carabiner-type clip 34 comprises a lever arm 34A which is pivotally mounted on the body 34B of carabiner 34. The lever arm 34A rotates in an inward direction but is prevented from rotating outward by a stop 34C. Carabiner 34 is particularly adapted for attachment to loops and clasps which are commonly found on vests and life-rafts. For example, FIG. 3 illustrates container 28 attached to the side of a life-raft by caribiner 34.

As shown in FIG. 2, a balloon 12, a pressure vessel 14 and a tether line 18 are housed within container 28. Pressure vessel 14 contains a pressurized, lighter-than-air gas, such as helium, which is used to inflate balloon 12. Pressure vessel 14 is preferably constructed from a lightweight metal such as aluminum, but can also be constructed from woven fibers coated with an epoxy resin. Container 28 is capable of surviving severe impact without suffering deformation or puncturing which may damage pressure vessel 14 causing a leak of the lighter-than the contents within. If necessary, reinforcing riblets or metal braces (not shown) can be added to container 28 to provide it with added rigidity and resistance to deformation. In addition, container 28 can be placed in a form fitting Kevlar case to provide it with added resistance to puncture.

An RF transmitter 16A, a GPS receiver 16B, and a strobe light 20 are fixedly attached to the side of pressure vessel 14 by strap 36 or some other attaching means which will not puncture pressure vessel 14. The RF transmitter 16A is of conventional design and can be of any type which is currently used in survival and rescue applications.

GPS receiver 16B receives signals from satellites in earth orbit. The receiver 16B decodes the signals, and generates precise latitude and longitude global position coordinates. GPS receivers are commercially available and in use, i.e. in applications such as car navigation systems and aircraft navigation systems, and as such the operation of GPS positioning systems need not be described in detail herein. Briefly, however, GPS receiver 16B integrates a navigation computer along with a radio receiver which receives positioning signals from the orbiting satellites. At any one time, at least four satellites are in view of the receiver and the exact position of the satellites is known. The signals received from the satellites contain a coded time stamp which indicates the time the signal was transmitted. The GPS receiver 16B subtracts the transmission time from the reception time, based upon an internal clock located on receiver 16B, and multiplies this time difference by the speed of light. This gives the distance of the receiver 16B from the satellite which generated the signal. Using four or more satellites, the exact positions of which are known, the navigation computer within receiver 16B is able to calculate the position of receiver 16B and indicate the position in latitude and longitude coordinates.

The coordinates, as determined by Receiver 16B, are communicated to RF transmitter 16A which broadcasts the exact location of the victim to be rescued in morse code or any other appropriate code. Thus, the RF transmitter 16A provides a homing signal which indicates the exact location of the origin of the signal. The RF transmitter 16A and GPS receiver 16B can be combined to form a combined GPS/RF unit. Currently, the Air Force and Navy utilize the Talon Hook radio system which has a UHF radio combined with a GPS unit. The UHF radio broadcasts the exact position of the downed pilot, as received from the GPS unit. The Talon Hook system broadcasts the position coordinates in an encrypted manner and in burst transmissions. This prevents any hostile forces from locating the pilot before rescue can be effected.

An intermittent flashing light 20, preferably a strobe light, aids in visual location of the victim to be rescued by providing bright, intermittent visual signal. A typical strobe accomplishes this by the triggered discharge of an energy storage capacitor through a special flash tube filled with xenon gas at low pressure to produce a very short burst of high intensity white light. The typical strobe comprises a power supply, energy storage capacitor, a trigger circuit (i.e. an a-stable multivibrator), and a flash tube.

Strobe light 20 and combined GPS/RF unit 16 are preferably powered by separate battery packs, however, a single battery unit can power both combined unit 16 and strobe light 20. As shown in FIG. 1 the battery packs can be accessed for testing via an access panel 46 located on container 28. If GPS/RF unit 16 and strobe light 20 share a battery pack, then a single access panel 46 is provided on container 28, whereas if GPS/RF unit 16 and strobe light 20 have separate battery packs, multiple access ports are provided on the face of container 28. A back-up battery pack (not shown) can also be provided under either scenario.

Pressure vessel 14, having GPS/RF unit 16 and strobe light unit 20 strapped thereto, is placed within container 28 atop spool 26 around which is wound tether 18. Tether 18 is connected to the bottom, inside of container 28 and the bottom of pressure vessel 14. GPS/RF unit 16 and strobe light 20 each are both activated by push-button or "deadman" type switches 24A and 24B respectively. GPS/RF unit 16 and strobe light 20 are in an activated state immediately before they are placed in container 28. GPS/RF unit 16 and strobe light 20 are mounted to pressure vessel 14 such that upon placement into container 28, push-button switches 24A and 24B contact the inner surface of container 28 and are depressed, deactivating GPS/RF transmitter 16 and strobe 20.

Balloon 12 is constructed from a puncture resistant material, such as mylar, and is coated with a radar reflective material 40. Balloon 12 is fixedly mounted to the neck of pressure vessel 14 by a strap 48 or other suitable attachment device such as a clamp or clasp. The flow of lighter-than-air gas from pressure vessel 14 to balloon 12 is triggered by opening valve 42 which is located within the neck of pressure vessel 14. Valve 42 comprises a solenoid which is normally closed and can either be manually or automatically opened. For manual operation, a finger tab 32, located on the outside of container 28, is linked to valve 42 by an arm 32A. Valve 42 is opened manually by the user gripping tab 32 and pulling it in a direction outward from container 28. If automatic operation is desired, valve 42 is controlled by an altimeter 48. Altimeter 48 is linked to solenoid 42 by an appropriate control circuit such that upon attaining a pre-set desired altitude solenoid valve 42 opens allowing for the free flow of gas into balloon 12.

Upon opening valve 42, balloon 12 is filled with lighter-than-air gas causing it to expand and press against the top of container 28 which is attached to container 28 by perforated seal 30. Perforated seal 30 allows the top of container 28 to be removed as balloon 12 is inflated and applies force against the top of container 28. Once the balloon 12 breaks free of the container 28 it will rise along with pressure vessel 14. As pressure vessel 14 exits the container 28, the push-button switches 24A and 24B extend activating GPS/RF unit 16, which transmits radio position signals 54, and strobe light 20, which emits high intensity pulses of light 52. Tether line 18 is connected to the bottom of canister 14 and container 28 and spools out as balloon 12 rises. The balloon 12 will rise to the maximum level as permitted by tether 18 and will hover above the pilot or victim as visual and RF signals are sent. The balloon 12, by virtue of its radar reflective coating 40, will also serve as a radar target.

The invention having been disclosed in connection with the foregoing variations and examples, additional variations will now be apparent to persons skilled in the art. The invention is not intended to be limited to the variations specifically mentioned.

I claim:

1. A device for use in conjunction with a flotation device, such as a life vest or a life boat, for locating a person lost at sea, the device comprising:
   a water-tight container having dimensions sufficiently compact to be carried by a flotation device;
   a signalling apparatus comprising an inflatable balloon, a vessel of pressurized, lighter-than-air gas for inflating the balloon, a flashing light beacon, a GPS receiver, and an RF transmitter;
   a mechanism for inflating the balloon with the gas to deploy the signalling apparatus, the signalling apparatus being encased by the container when not deployed, the pressure vessel, the flashing light beacon, the GPS receiver, and the RF transmitter being hoisted aloft upon the deploying of the signalling apparatus;
   at least one power source for the flashing light beacon, the GPS receiver, and the RF transmitter;
   at least one switch automatically activating the power source when the balloon is inflated and the signalling apparatus is deployed;
   wherein the balloon has radar reflective material disposed thereon, the GPS receiver includes means for determining coordinates of the person lost at sea, the RF transmitter broadcasts the coordinates intermittently with a homing signal, and the flashing beacon light provides a visual signal perceptible in a marine environment;
   wherein the radar reflective material of the balloon, the visual signal of the flashing light beacon, the transmission of the coordinates of the person to be rescued, and the transmission of the homing signal each occur independently and substantially simultaneously when the signalling apparatus is deployed.

2. The device of claim 1, wherein the container has a sidewall, and further comprising two of the switches, the first switch for the flashing light beacon and the second switch for the GPS receiver and RF transmitter, the switches being of the negative-pressure type, being disposed against the sidewall in the off position, and being actuated when the signalling apparatus exits the container while being hoisted aloft.

3. The device of claim 2, wherein the power source comprises a first battery pack for the flashing light beacon and a second battery pack for the GPS receiver and RF transmitter, and wherein the sidewall of the container has access ports defined therein, the access ports being positioned adjacent to respective ones of the battery packs so as to provide access thereto.

4. The device of claim 1, wherein the flashing light beacon comprises a strobe light.

5. The device of claim 1, wherein the mechanism for inflating the balloon includes a solenoid valve and an altimeter for determining altitudes, and means responsive to detection of a pre-determined one of the altitudes for activating the valve to inflate the balloon.

6. The device of claim 1, wherein the mechanism for inflating the balloon comprises a solenoid and a finger tab located on the outside of the container for manually inflating the balloon to deploy the signalling apparatus.

7. A device for assisting in the rescue of a person lost at sea, the device comprising:
   a watertight container having a bottom, a container sidewall, and a releasable cap;
   means for securing the container in proximity to the person to be rescued;
   a vessel of pressurized, lighter-than-air gas having a nozzle and a release valve operatively connected to the nozzle, the vessel having a top, bottom, and vessel sidewall;
   a strobe light, a GPS receiver, and an RF transmitter secured at respective locations on the vessel sidewall;
   an inflatable balloon pneumatically connected to the nozzle of the vessel;
   a tether having one end secured to the vessel and the other end secured to the inside of the container;
   the vessel, the strobe light, the balloon, the tether, the GPS receiver and the RF transmitter being encased within the container, the balloon being located generally proximate to the cap of the container; the tether being located proximate to the bottom of the container, and the vessel, the strobe light, the GPS receiver, and the RF transmitter being located at medial locations within the container;
   a first negative pressure switch for activating the flashing light beacon, and a second negative pressure switch for activating the GPS receiver and the RF transmitter, the switches being located to be in contact with the sidewall of the container when received therein;
   means for opening the release valve to inflate the balloon, the cap of the container opening under pressure from the inflating balloon, the balloon being sufficiently sized to hoist the vessel, the strobe light, the GPS receiver, and the RF transmitter to a height corresponding to the length of the tether.

* * * * *